Jan. 25, 1938.    A. E. HUTT    2,106,351
AUTOMATIC SHUT-OFF VALVE
Filed Oct. 7, 1936

INVENTOR.

ATTORNEY.

Patented Jan. 25, 1938

2,106,351

UNITED STATES PATENT OFFICE 2,106,351

AUTOMATIC SHUT-OFF VALVE

Albert E. Hutt, Riverside, Conn.

Application October 7, 1936, Serial No. 104,356

6 Claims. (Cl. 137—68)

This invention relates to automatic shut-off valves for use with equipment for dispensing liquids and whose function is to remain open when liquid is passing through it and to close when the liquid is exhausted so that air will not be allowed to pass through the valve.

This invention further relates to automatic shut-off valves for any liquid and is not limited to oils for which it is primarily intended.

This invention further relates to automatic shut-off valves used in connection with suction pumps as well as with air tight containers from which the liquid is forced by air pressure.

This invention further relates to automatic shut-off valves that allow practically all of the contents of the containers in which they are located to be dispensed before they close.

This invention further relates to automatic shut-off valves used in oil dispensing equipment such as is used in garages and service stations.

This invention consists of the novel construction hereinafter described and finally claimed.

For the purpose of illustrating my invention I have shown in the accompanying drawing the form thereof which is at present preferred by me since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

The nature, characteristic features and scope of the invention will be more fully understood from the description taken in connection with the accompanying drawing forming part thereof, and in which.

Figure 1:
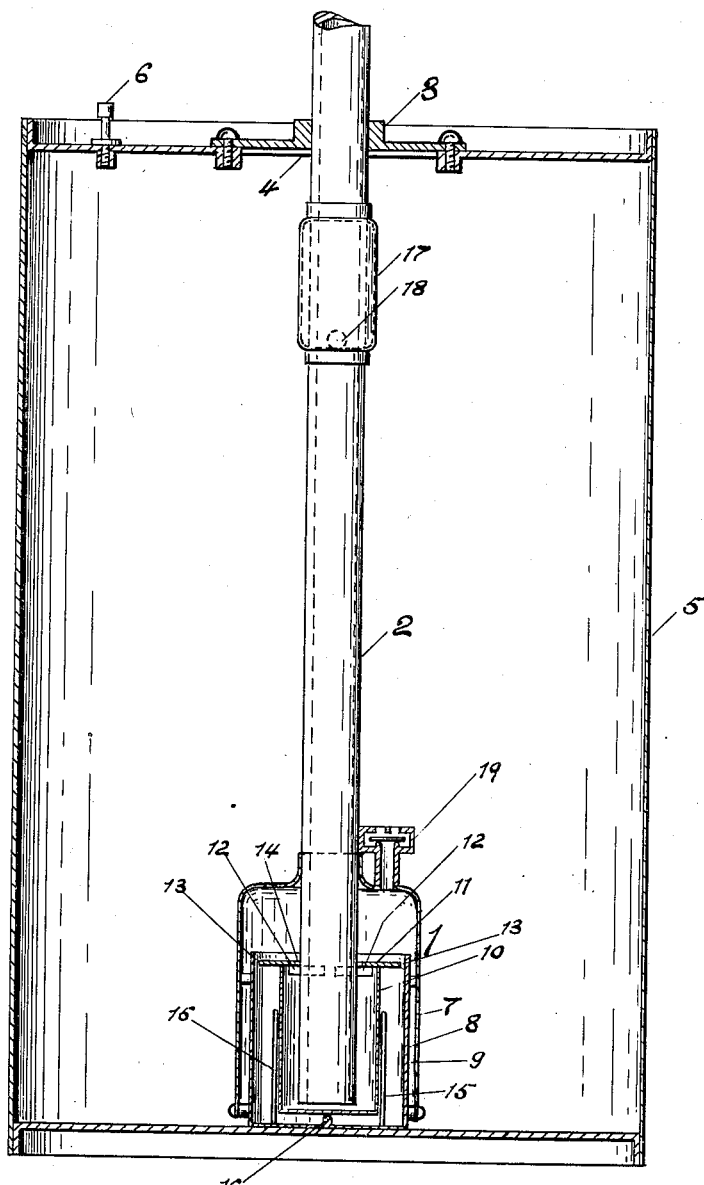
Fig. 1 shows my novel shut-off valve mounted in a tank disposed to be put under pressure, the tank and valve being in sectional elevation.
Figure 2:
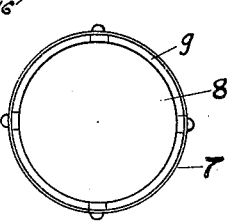
Fig. 2 shows a plan view of the bottom of the valve looking upward.

Referring now to the drawing. 1 represents my automatic shut-off valve mounted on the lower end of the outlet pipe 2, to which, at its upper end, is attached the flange 3, which flange 3 is used to close the opening 4 in the tank 5. 6 represents any conventional check valve for the purpose of introducing air pressure into the tank 5. 7 represents a bell shaped housing attached to the outlet pipe 2, which housing 7 is open at its lower end. 8 represents a cup shaped liquid container mounted in the housing 7 in such manner that it projects below the bottom edge of the housing 7 and is spaced from it so as to form the annular liquid passage 9. 10 represents a cup shaped float to which is attached the flange 11. The cup shaped float 10 and the flange 11 attached thereto are so constructed that the resultant assembly will float when immersed in a liquid. 12 represents openings in the float 10 just below the flange 11. 13 and 14 represent annular passages for the transfer of liquid from the housing 7 to the liquid container 8 and the float 10. 15 represents vertical guides to loosely guide the float 10 in an upward or downward direction. 16 represents a stop to limit the downward travel of the float 10. 17 represents a tubular air chamber hermetically attached around the outlet pipe 2, 18 an opening in the pipe 2 to connect the inside of said pipe 2 with the air chamber 17 and 19 a check valve to allow any air trapped in the bell shaped housing 7 to escape into the tank 5.

The raising of the float 10 so that the bottom of the cup contacts with the end of the pipe 2 closes the valve.

The operation is as follows:—

Assuming that the tank 5 is partly full of liquid and that the parts are in the position shown in the drawing, also that air pressure has been introduced through the valve 6 into the tank 5. The pressure of the air acting on top of the liquid forces said liquid from the tank 5 through the annular opening 9 into the bell shaped member 7 from where it passes through the openings 13 and 14 into the liquid container 8 and the float 10, filling both of them. The float being full of liquid as well as submerged in liquid will not have any buoyancy and therefore will not rise off the stop 16 and the liquid will pass from the float 10 into the pipe 2 and thence to the outside of the tank 5.

An established law of hydraulics states that, "In the flow of a liquid through a conduit, the pressure head at any section is less than the hydrostatic head and the difference between the two is greater the smaller the section or the greater the velocity of flow".

The liquid flowing through the restricted openings 13 and 12 into the float 10 suffers certain drops in pressure due to this law; likewise the liquid flowing through the restricted opening 14 and the float 10 also suffers certain drops in pressure due to the same law. These pressure changes create forces acting in various directions on the float 10 and its flange 11.

The opening 13 into the liquid container 8 and the openings 12 and 14 into the float 10 are so proportioned as to ensure that those forces tending to raise the float 10 off the stop 16 shall not exceed the forces tending to depress the float 10 when liquid is passing through all these openings at the same time, thus ensuring that the valve will remain open as long as liquid is passing through it.

When the liquid in the tank 5 drops to a level below the bottom of the bell shaped member 7, air will pass through the passage 9 into said member 7 and the level of the liquid in container 8, due to continued flow through pipe 2, will drop to a point level with the bottom of the openings 12, but no further, so that the float 10 will retain the effect of the buoyancy of the surrounding liquid. There being no liquid now passing through the openings 13 and 12, there will not be any drop in pressure affecting the liquid in the container 8, which will then be under the same pressure as the air in the tank 5. The liquid however is still passing from the float 10 to the pipe 2 which causes a drop in pressure inside the float 10, which difference in pressure between the inside of the float 10 and the liquid in the container 8 causes the float 10 to be pushed up against the end of the pipe 2, thus closing the valve before air can pass into the pipe 2.

At low velocities of liquid flow, the law of hydraulics is no longer a factor in this valve. It is for this reason that the float 10 and its flange 11 are so constructed that when the float 10 is not full of liquid, it will be buoyed up by the surrounding liquid in the container 8. When this condition of low velocity of liquid prevails, the valve closes when the level of the liquid in the float 10 drops sufficiently for the float 10 and its flange 11 to be buoyed up by the liquid in the container 8 until the inside of the float 10 contacts with the end of the pipe 2, which also occurs before air can pass into the pipe 2.

The air chamber 17 is for the purpose of trapping a certain volume of air (an elastic medium) in the outlet pipe 2, which air, when the pressure in the tank 5 has been released, (should the outlet to the pipe 2 have been closed as by a valve) allows the float 10 to fall back to the stop 16, thus opening the valve, which would not occur were the pipe 2 to contain a solid column of liquid.

From the above description it should be apparent to anyone familiar with the art, that this shut-off valve will operate equally well if a suction pump be mounted on the upper end of the pipe 2 and an air vent be substituted for the check valve 6. It should also be apparent that the float 10 and its flange 11 can be made of a weight that will not float when empty if it is not required to operate at low velocities of liquid flow.

I am aware that this invention may be embodied in other specific forms without departing from the spirit or essential attributes thereof and I therefore desire the present embodiment to be considered in all respects as illustrative and not restrictive, reference being had to the appended claims rather than to the foregoing description to indicate the scope of this invention.

Having thus described my invention what I claim as new and desire to secure by Letters Patent is:—

1. In an automatic shut-off valve, a housing open at its lower end and closed at its upper end, a check valve in said upper end, an outlet pipe attached to said upper end and depending within said housing, a cup shaped liquid container closed at its bottom end and open at its upper end and attached within the open end of said housing and spaced therefrom so as to form an annular passage between the outer wall of said liquid container and the inner wall of said housing, a cup shaped float closed at its lower end and open at its upper end located within said liquid container and surrounding the depending end of said outlet pipe, vertical guides for said float, a stop to limit the downward travel of said float, a flange attached to the upper open end of said float, openings in said float below said flange, the inside diameter of said flange being greater than the outside diameter of said outlet pipe, the outside diameter of said flange being smaller than the inside diameter of said liquid container, the passages so created adjacent the outside and inside edges of said flange, the openings in said float below said flange and the inside dimensions of said float being so proportioned and the stop being so located as to cause said float to remain in contact with said stop when liquid is flowing through all said passages and to cause said float to rise and contact with the end of said outlet pipe when liquid ceases to flow through the passages adjacent the edges of said flange.

2. A device as described in claim 1 but characterized in that the cup shaped float and its attached flange is constructed of such material and thickness of material that it will float in a liquid when partly filled with the same liquid.

3. In an automatic shut-off valve, a housing open at its lower end and closed at its upper end, means for preventing air being trapped in said housing, an outlet pipe attached to said upper end and depending within said housing, a cup shaped liquid container closed at its bottom end and open at its upper end attached within the open end of said housing and spaced therefrom so as to form an annular passage between the outer wall of said liquid container and the inner wall of said housing, a cup shaped float closed at its lower end and open at its upper end located within said liquid container and surrounding the depending end of said outlet pipe, vertical guides for said float, a stop to limit the downward travel of said float, a flange attached to the upper open end of said float, openings in said float below said flange, the inside diameter of said flange being greater than the outside diameter of said outlet pipe, the outside diameter of said flange being smaller than the inside diameter of said liquid container, the passages so created adjacent the outside and inside edges of said flange, the openings in said float below said flange and the inside dimensions of said float being so proportioned and the stop being so located that the forces, created by the flow of liquid through the various passages of the valve, acting in various directions on the float and its flange, tend to keep said float in contact with said stop but cause said float to be forced up against the end of said outlet pipe when liquid ceases to flow through the passages adjacent the inner and outer edges of said flange.

4. A device as described in claim 3, but characterized by the addition of a compression and expansion chamber located in said outlet pipe for the purpose of unseating said float from said outlet pipe when the pressure holding them together has been removed.

5. In an automatic shut-off valve for liquids, a cup shaped valve member closed at its lower end and open at its upper end, a pipe located within said valve member, the end of which forms the valve seat, a circular flange attached to the upper open end of said valve member and encircling said pipe, passages in the vertical wall of said valve member below said flange, a housing open at its lower end attached to said pipe, a liquid container located in said housing and encircling said cup shaped valve member disposed for directing a liquid into and through said valve member and said pipe in such manner that the forces set up, due to the law of hydraulics affecting flowing liquids, tend to force said valve member in a downward direction as long as liquid is flowing into it and in an upward direction when the liquid ceases to flow into it but is still flowing out of it into said pipe.

6. A device as described in claim 5, but characterized by the cup shaped valve member being constructed of such material that it will float in a liquid when partly filled with the same liquid.

ALBERT E. HUTT.